(12) United States Patent
Ito et al.

(10) Patent No.: US 10,832,853 B2
(45) Date of Patent: Nov. 10, 2020

(54) COIL AND COIL PRODUCTION METHOD

(71) Applicant: CKD Corporation, Komaki-shi, Aichi (JP)

(72) Inventors: Akihiro Ito, Komaki (JP); Masayuki Kouketsu, Komaki (JP); Hideki Goda, Osaka (JP); Takashi Tasaki, Osaka (JP); Kazuhiro Izumoto, Osaka (JP)

(73) Assignee: CKD Corporation, Komaki-shi (JP)

( * ) Notice: Subject to any disclaimer, the term of this patent is extended or adjusted under 35 U.S.C. 154(b) by 438 days.

(21) Appl. No.: 15/619,072

(22) Filed: Jun. 9, 2017

(65) Prior Publication Data

US 2017/0278620 A1 Sep. 28, 2017

Related U.S. Application Data

(63) Continuation of application No. PCT/JP2015/084693, filed on Dec. 10, 2015.

(30) Foreign Application Priority Data

Dec. 11, 2014 (JP) .................................. 2014-250815

(51) Int. Cl.
*H01F 5/00* (2006.01)
*H01F 27/28* (2006.01)
(Continued)

(52) U.S. Cl.
CPC ....... *H01F 27/2804* (2013.01); *B29C 53/562* (2013.01); *B32B 7/02* (2013.01);
(Continued)

(58) Field of Classification Search
CPC .......... H01F 2027/2857; H01F 27/323; H01F 41/122; H01F 5/06; H01F 41/175; H01F 41/063; H01F 27/2847
(Continued)

(56) References Cited

U.S. PATENT DOCUMENTS

| | | | | |
|---|---|---|---|---|
| 2,521,513 A | * | 9/1950 | Gray .................... | H01F 27/2847 323/355 |
| 3,086,184 A | * | 4/1963 | Nichols ................. | H01F 27/322 336/60 |

(Continued)

FOREIGN PATENT DOCUMENTS

| CN | 85201396 U | 1/1986 |
|---|---|---|
| CN | 101310430 | 1/1986 |

(Continued)

OTHER PUBLICATIONS

Search Report dated Sep. 22, 2014 from International Application No. PCT/JP2014/069882.

(Continued)

*Primary Examiner* — Alexander Talpalatski
*Assistant Examiner* — Joselito Baisa
(74) *Attorney, Agent, or Firm* — Beyer Law Group LLP

(57) ABSTRACT

A coil sheet includes a conductor layer, a thermally resistant organic insulating layer, a thermosetting adhesive layer in a B-stage state, and a base layer, such that the conductor layer and the insulating layer are bonded to the base layer with the adhesive layer. A coil is formed of a laminate sheet including a conductor layer, an insulating layer, and an adhesive layer of the coil sheet which are released from the base layer thereof, wherein the laminate sheet is wound around a specific axis a plurality of times, and the adhesive layer is thermally cured.

10 Claims, 13 Drawing Sheets

(51) Int. Cl.

| | | |
|---|---|---|
| *H01F 41/04* | (2006.01) | |
| *H01F 5/06* | (2006.01) | |
| *B32B 38/10* | (2006.01) | |
| *B29C 53/56* | (2006.01) | |
| *H01F 27/32* | (2006.01) | |
| *B32B 37/12* | (2006.01) | |
| *B32B 7/02* | (2019.01) | |
| *H01F 41/12* | (2006.01) | |
| *H02K 15/10* | (2006.01) | |
| *H02K 3/30* | (2006.01) | |
| *H01F 41/063* | (2016.01) | |
| *B32B 7/12* | (2006.01) | |
| *B32B 15/08* | (2006.01) | |
| *B32B 15/20* | (2006.01) | |
| *H01F 7/08* | (2006.01) | |
| *H01F 7/06* | (2006.01) | |
| *H02K 3/02* | (2006.01) | |
| *H02K 9/19* | (2006.01) | |
| *H02K 41/02* | (2006.01) | |

(52) U.S. Cl.
CPC ............... *B32B 7/12* (2013.01); *B32B 15/08* (2013.01); *B32B 15/20* (2013.01); *B32B 37/12* (2013.01); *B32B 38/10* (2013.01); *H01F 5/003* (2013.01); *H01F 5/06* (2013.01); *H01F 7/08* (2013.01); *H01F 27/2876* (2013.01); *H01F 27/322* (2013.01); *H01F 27/323* (2013.01); *H01F 41/041* (2013.01); *H01F 41/063* (2016.01); *H01F 41/122* (2013.01); *H02K 3/30* (2013.01); *H02K 15/10* (2013.01); *B32B 2307/202* (2013.01); *B32B 2307/206* (2013.01); *B32B 2307/306* (2013.01); *B32B 2379/08* (2013.01); *B32B 2457/00* (2013.01); *H01F 2007/068* (2013.01); *H01F 2027/2809* (2013.01); *H02K 3/02* (2013.01); *H02K 9/19* (2013.01); *H02K 41/02* (2013.01)

(58) Field of Classification Search
USPC ........................................................ 336/200
See application file for complete search history.

(56) References Cited

U.S. PATENT DOCUMENTS

| | | | |
|---|---|---|---|
| 3,247,476 A * | 4/1966 | Pintell | H01F 30/10 336/177 |
| 4,746,425 A | 5/1988 | Stickler et al. | |
| 4,848,262 A | 7/1989 | Freeman | |
| 4,864,262 A | 9/1989 | Deb | |
| 4,909,079 A | 3/1990 | Nishimura et al. | |
| 5,008,549 A | 4/1991 | Crewe | |
| 5,525,583 A | 6/1996 | Aized et al. | |
| 5,625,332 A | 4/1997 | Kamo et al. | |
| 5,965,245 A * | 10/1999 | Okano | C08J 5/24 428/209 |
| 6,124,775 A * | 9/2000 | Linkner, Jr. | B60T 8/363 251/129.15 |
| 6,144,280 A | 11/2000 | Amada et al. | |
| 6,331,810 B1 | 12/2001 | Jung | |
| 6,449,830 B1 | 9/2002 | Amada et al. | |
| 6,528,859 B2 * | 3/2003 | Odendaal | H01F 27/027 257/277 |
| 6,747,848 B2 | 6/2004 | Kasajima | |
| 6,859,994 B2 | 3/2005 | Oshima et al. | |
| 6,972,655 B2 | 12/2005 | Tobias | |
| 7,477,126 B2 * | 1/2009 | Weber | H01F 27/323 336/200 |
| 8,004,378 B2 | 8/2011 | Wanner | |
| 8,933,773 B2 * | 1/2015 | Nelges | H01B 3/40 174/135 |
| 9,472,334 B2 * | 10/2016 | Syvaranta | H01F 27/34 |
| 9,508,476 B2 | 11/2016 | Kouketsu et al. | |
| 2002/0067232 A1 | 6/2002 | Oshima et al. | |
| 2002/0190832 A1 | 12/2002 | Amada et al. | |
| 2004/0036848 A1 | 2/2004 | Frissen et al. | |
| 2004/0231138 A1 | 11/2004 | Kasahara et al. | |
| 2004/0247907 A1 | 12/2004 | Goda et al. | |
| 2004/0263309 A1 | 12/2004 | Ito | |
| 2006/0024257 A1 | 2/2006 | Chang et al. | |
| 2006/0025257 A1 | 2/2006 | Tanabe et al. | |
| 2006/0170525 A1 | 8/2006 | Urano et al. | |
| 2007/0169886 A1 * | 7/2007 | Watanabe | B32B 15/08 156/325 |
| 2008/0201944 A1 | 8/2008 | Sakamoto et al. | |
| 2009/0045683 A1 | 2/2009 | Vermeulen et al. | |
| 2009/0243781 A1 | 10/2009 | Nomura et al. | |
| 2012/0062866 A1 | 3/2012 | Binnard et al. | |
| 2012/0068708 A1 * | 3/2012 | Camp | G01R 33/3858 324/318 |
| 2012/0168212 A1 | 7/2012 | Ha et al. | |
| 2013/0069449 A1 | 3/2013 | Pharand et al. | |
| 2013/0069478 A1 | 3/2013 | Hamer | |
| 2013/0106546 A1 * | 5/2013 | Outten | H01F 30/12 336/5 |
| 2013/0120097 A1 * | 5/2013 | Hachiya | H01F 1/33 336/200 |
| 2013/0126082 A1 | 5/2013 | Kim et al. | |
| 2013/0171459 A1 * | 7/2013 | Wang | C09D 179/08 428/458 |
| 2013/0293340 A1 * | 11/2013 | Weber | H01F 27/2895 336/220 |
| 2014/0002228 A1 | 1/2014 | Hatanaka et al. | |
| 2014/0021169 A1 | 1/2014 | Lin et al. | |
| 2014/0022747 A1 | 8/2014 | Kawasaki et al. | |
| 2014/0227471 A1 | 8/2014 | Kawasaki et al. | |
| 2014/0300522 A1 * | 10/2014 | Kato | H01Q 7/06 343/788 |
| 2015/0382461 A1 | 12/2015 | Ha et al. | |
| 2016/0189845 A1 | 6/2016 | Ito et al. | |

FOREIGN PATENT DOCUMENTS

| | | |
|---|---|---|
| CN | 1343996 A | 4/2002 |
| CN | 1477449 A | 2/2004 |
| EP | 1372035 A2 | 12/2003 |
| JP | S56-147413 | 11/1981 |
| JP | S61-125006 U | 8/1986 |
| JP | S63-220734 | 9/1988 |
| JP | H1-100901 | 4/1989 |
| JP | H3-112641 | 5/1991 |
| JP | 04250605 A * | 9/1992 |
| JP | H05-074624 | 3/1993 |
| JP | H5-315178 | 11/1993 |
| JP | H7-330905 | 12/1995 |
| JP | H09-283360 A | 10/1997 |
| JP | H10-335768 | 12/1998 |
| JP | 2000-232016 | 8/2000 |
| JP | 2001-305750 | 11/2001 |
| JP | 2002-367834 | 12/2002 |
| JP | 2003-200527 | 7/2003 |
| JP | 2004-342755 | 12/2004 |
| JP | 2005-116611 A | 4/2005 |
| JP | 2005-179408 | 7/2005 |
| JP | 4022181 B | 12/2007 |
| JP | 2012-204440 | 10/2012 |
| JP | 2013-012645 | 1/2013 |
| JP | 2013-161939 | 8/2013 |
| JP | 2013-229211 | 11/2013 |
| KR | 10-19990029592 | 4/1990 |
| KR | 10-20080064217 | 7/2008 |
| KR | 10-20110115847 | 10/2011 |
| KR | 10-1216864 | 12/2012 |
| KR | 10-2013-0055220 A | 5/2013 |
| TW | 348256 B | 10/1986 |
| TW | 397997 B | 8/1987 |

(56) References Cited

FOREIGN PATENT DOCUMENTS

| TW | 200629307 A | 8/1995 |
|---|---|---|
| WO | 2015-016198 | 2/2015 |

OTHER PUBLICATIONS

Written Opinion dated Sep. 22, 2014 from International Application No. PCT/JP2014/069882.
Office Action from U.S. Appl. No. 14/812,922 dated May 5, 2016.
International Search Report from International Publication No. PCT/JP2014/073299 dated Dec. 16, 2014.
International Search Report from International Application No. PCT/JP2015/084693 dated Feb. 16, 2016.
Written Opinion from International Application No. PCT/JP2015/084693 dated Dec. 20, 2016.
International Search Report from International Application No. PCT/JP2015/084694 dated Feb. 16, 2016.
Written Opinion from International Application No. PCT/JP2015/084694 dated Feb. 16, 2016.
International Search Report from International Application No. PCT/JP2015/084695 dated Feb. 16, 2016.
Written Opinion from International Application No. PCT/JP2015/084695 dated Feb. 16, 2016.
Written Opinion of the International Preliminary Examination from International Application No. PCT/JP2015/084693 dated Dec. 20, 2016.
Chinese Office Action from Chinese Application No. 201480049039.0 dated May 2, 2017.
Extended European Search Report from European Application No. 14843006.9 dated Apr. 21, 2017.
Korean Office Action from Korean Application No. 10-2017-7015696 dated Jun. 11, 2018.
Office Action from U.S. Appl. No. 15/619,268 dated Mar. 15, 2018.
Korean Office Action from Korean Application No. 10-2017-7015697 dated Mar. 14, 2018.
Chinese Office Action from Chinese Application No. 201580067505.2 dated Feb. 24, 2018.

\* cited by examiner

COIL AND COIL PRODUCTION METHOD

CLAIM OF PRIORITY

This application is a Continuation of International Patent Application No. PCT/JP2015/084693, filed on Dec. 10, 2015, which claims priority to Japanese Patent Application No. 2014-250815, filed on Dec. 11, 2014, each of which is hereby incorporated by reference.

BACKGROUND OF THE INVENTION

1. Field of the Invention

The present invention relates to a coil sheet, a coil, and a method for producing a coil.

2. Description of the Related Art

A conventional coil is formed by winding a plate member including an elongated, electrically conductive plate and an insulating layer bonded to the plate (for example, see Japanese Patent No. 4022181).

SUMMARY OF THE INVENTION

The present inventors have devised a coil sheet including the aforementioned plate member (including the conductor layer and the insulating layer) bonded to a base layer with an adhesive layer. According to the coil sheet, when a laminate sheet (including the conductor layer, the insulating layer, and the adhesive layer) is released from the base layer and then wound into a coil, radially adjacent portions of the laminate sheet adhere to one another by the adhesive force of the adhesive layer.

However, a low adhesive force of the adhesive layer may cause separation of radially adjacent portions of the laminate sheet during energization of the coil or may cause insufficient strength of the coil. In contrast, a high adhesive force of the adhesive layer may cause problems during release of the adhesive layer from the base layer in the coil sheet.

The present invention has been conceived to solve the aforementioned problems, and an object of the present invention is to provide a coil sheet that can maintain the releasability between a base layer and an adhesive layer and can form a coil exhibiting improved adhesion between radially adjacent portions of a lamination sheet. Another object of the present invention is to provide a coil. Still another object of the present invention is to provide a method for producing a coil.

Aspects of the present invention for solving the aforementioned problems, and actions and effects thereof will be described below.

One aspect of the present invention provides a coil sheet in which a conductor layer and a thermally resistant organic insulating layer are boned to a base layer with a thermosetting adhesive layer in a B-stage state.

According to the above configuration, since the thermosetting adhesive layer is in a B-stage state, the base layer does not strongly adhere to the adhesive layer; i.e., the releasability between the base layer and the adhesive layer can be maintained. A winding can be formed by winding a laminate sheet around a specific axis a plurality of times, the laminate sheet including the conductor layer, the insulating layer, and the adhesive layer, with the layers being released from the base layer. When the adhesive layer is thermally cured as a result of heating of the winding, the adhesion between radially adjacent portions of the laminate sheet is increased. This can reduce the misalignment or separation of radially adjacent portions of the laminate sheet during energization of the coil, and can increase the strength of the coil. As used herein, the term "B-stage state" refers to the state where the adhesive layer has not yet been fully cured, but has been apparently solidified; for example, the adhesive layer has been semi-cured, or the solvent has been evaporated from the layer.

According to one aspect of the present invention, the coil sheet may have a structure in which the conductor layer, the insulating layer, the adhesive layer, and the base layer are stacked in this order. The conductor layer may have a thermal expansion coefficient approximately equal to that of the insulating layer.

According to the above configuration, the conductor layer may have a thermal expansion coefficient approximately equal to that of the insulating layer, and thus a difference in expansion between the conductor layer and the insulating layer is reduced even if the conductor layer and the insulating layer thermally expand during energization of the coil. This prevents separation of the conductor layer and the insulating layer, which would otherwise occur due to the difference in thermal expansion between the layers.

According to one aspect of the present invention, the conductor layer may be formed of copper, and the insulating layer may be formed of a polyimide-silica hybrid.

According to one aspect of the present invention, the conductor layer may be formed of copper, and the insulating layer may have a thermal expansion coefficient of 10 to 24 ppm/° C. Since the thermal expansion coefficient of copper is 17 ppm/° C. (mm/° C./m), the separation of the conductor layer and the insulating layer, which would otherwise occur due to the difference in thermal expansion between the layers, can be prevented by adjusting the thermal expansion coefficient of the insulating layer to 10 to 24 ppm/° C.

According to one aspect of the present invention, the conductor layer may be subjected to surface roughening treatment. Such a surface roughening treatment of the conductor layer can improve the adhesion between the conductor layer and the layer in contact with the conductor layer.

Another aspect of the present invention provides a coil comprising a laminate sheet composed of the conductor layer, the insulating layer, and the adhesive layer of the coil sheet as described above in any one of the aspects of the present invention, the conductor layer, the insulating layer, and the adhesive layer being released from the base layer of the coil sheet, wherein the laminate sheet is wound around a specific axis a plurality of times, and the adhesive layer is thermally cured.

The above configuration leads to an increase in adhesion between radially adjacent portions of the laminate sheet. This can reduce the misalignment or separation of radially adjacent portions of the laminate sheet during energization of the coil, and can increase the strength of the coil.

According to one aspect of the present invention, the amount of misalignment between end portions, in a direction of the specific axis, of radially adjacent portions of the laminate sheet wound around the specific axis a plurality of times may be 2% or less the width of the laminate sheet.

According to the above configuration, the amount of misalignment between end portions, in a direction of the specific axis, of radially adjacent portions of the laminate sheet wound around the specific axis a plurality of times is 2% or less the width of the laminate sheet, and the adhesion between radially adjacent portions of the laminate sheet is improved by the thermal curing of the adhesive layer. Thus, the misalignment between radially adjacent portions of the laminate sheet can be maintained at reduced level.

Another aspect of the present invention provides a method for producing a coil characterized by comprising: a step of releasing a conductor layer, a thermally resistant insulating layer, and a thermosetting, uncured adhesive layer from a base layer in a coil sheet, wherein the conductor layer and the insulating layer are bonded to the base layer with the adhesive layer; a step of forming a winding by winding a laminate sheet around a specific axis a plurality of times, the laminate sheet including the conductor layer, the insulating layer, and the adhesive layer, with the layers being released in the releasing step; and a step of thermally curing the adhesive layer by heating the winding formed in the winding forming step.

According to the above-described process, the conductor layer, the thermally resistant insulating layer, and the thermosetting, uncured adhesive layer are released from the base layer in the coil sheet, wherein the conductor layer and the insulating layer are bonded to the base layer with the adhesive layer (releasing step). At that time, the thermosetting adhesive layer is uncured. Therefore, the base layer does not strongly adhere to the adhesive layer; i.e., the releasability between the base layer and the adhesive layer can be maintained.

The laminate sheet, which includes the conductor layer, insulating layer, and adhesive layer that are released in the releasing step, is wound around the specific axis a plurality of times, thereby forming a winding (winding forming step). At that time, radially adjacent portions of the laminate sheet adhere to one another by the adhesive force of the adhesive layer. Therefore, misalignment of the radially adjacent portions of the laminate sheet is prevented during the formation of the winding by winding of the laminate sheet.

Subsequently, the winding formed in the winding forming step is heated to thermally cure the adhesive layer (thermally curing step). This step can improve the adhesion between radially adjacent portions of the laminate sheet, can reduce the misalignment or separation of radially adjacent portions of the laminate sheet during energization of the coil, and can increase the strength of the coil.

According to one aspect of the present invention, in the winding forming step, the laminate sheet may be wound under application of a specific tension to the sheet. Since the laminate sheet is wound under application of a specific tension to the sheet, there can be prevented formation of gaps between radially adjacent portions of the laminate sheet. In general, the winding of the laminate sheet under application of a specific tension thereto is likely to cause an increase in the amount of misalignment between radially adjacent portions of the laminate sheet. In the present invention, radially adjacent portions of the laminate sheet adhere to one another by the adhesive force of the adhesive layer, resulting in reduced misalignment between the radially adjacent portions of the laminate sheet.

According to one aspect of the present invention, in the winding forming step, end portions of the laminate sheet in a width direction thereof may be detected by a sensor, and the position of the laminate sheet is adjusted in a direction of the specific axis on the basis of the results of detection of the end portions by the sensor. According to the above step, end portions, in the width direction, of the laminate sheet are detected by a sensor, and the position of the laminate sheet is adjusted in the direction of the specific axis on the basis of the results of detection of the end portions by the sensor. Thus, the misalignment between radially adjacent portions of the laminate sheet can be reduced in the direction of the specific axis during winding of the sheet around the specific axis.

According to one aspect of the present invention, the thermally curing step may include a step of heating the winding with a heater in a direction of the specific axis. Since the winding is heated with a heater in the direction of the specific axis (i.e., the central axis of the winding), heat can be transferred by the conductor layer in the direction of the specific axis. Thus, heat is readily transferred to the interior of the winding, and the adhesive layer in the winding is readily thermally cured. In the case where the winding is heated with a heater in a radial direction, heat is less likely to be transferred to the interior of the winding, since heat transfer in the radial direction is hindered by the insulating layer and the adhesive layer.

DETAILED DESCRIPTION OF THE INVENTION

An embodiment of the present invention will be described with reference to the drawings. The present embodiment embodies a cooling structure for a coil used in in an electromagnetic actuator. The electromagnetic actuator (e.g., a solenoid valve) may include the cooling structure of the coil according to the present embodiment.

Figure 1:
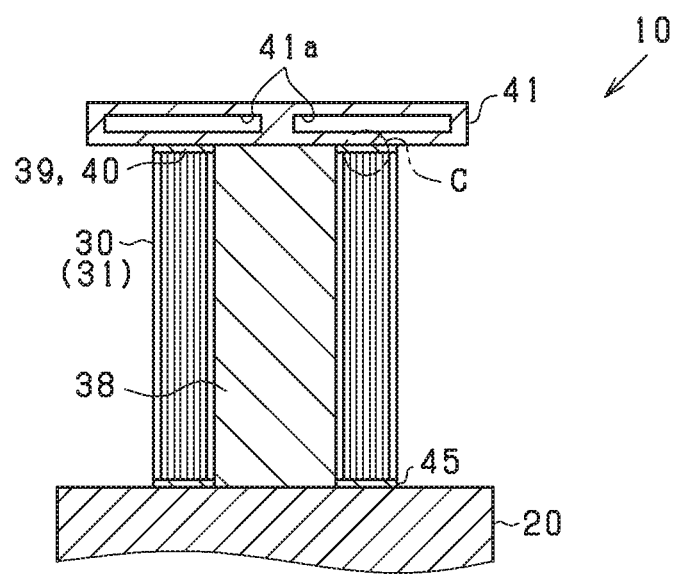
FIG. 1 is a schematic diagram illustrating a cooling structure of a coil in accordance with one embodiment of the present invention.

As illustrated in FIG. 1, a cooling structure 10 for a coil 30 includes a body 20, the coil 30, a stationary iron core 38, and a cooling plate 41.

The body 20 is, for example, a body or housing of an electromagnetic actuator. The body 20 is formed of, for example, stainless steel or aluminum and has a plate-like (rectangular parallelepiped) shape.

The coil 30 includes a cylindrical winding 31 formed by winding a strip-like copper foil (conductor) around the circular columnar stationary iron core 38 a plurality of times. The circular columnar stationary iron core 38 is formed of a ferromagnet, such as iron. The axial lower end (first end) of the coil 30 is bonded to the body 20 with an adhesive 45. The adhesive 45 is, for example, an epoxy adhesive. The axis of the stationary iron core 38 and the axis of the coil 30 correspond to a specific axis.

The cooling plate 41 is attached to the axial upper end (second end) of the coil 30 through an alumina layer 39 and an adhesive 40. The structures of the alumina layer 39 and the adhesive 40 and attachment of the cooling plate 41 will be described below.

The cooling plate 41 is mainly formed of alumina. The cooling plate 41 includes therein a flow passage 41a for cooling water (cooling medium). The flow passage 41a extends in an in-plane direction of the cooling plate 41. Cooling water flows through the flow passage 41a.

In the aforementioned configuration, when electric current flows through the coil 30, a magnetic flux is generated at the stationary iron core 38. The generated magnetic flux moves a movable part (e.g., a valve) of the electromagnetic actuator. When electric current flows through the coil 30, the winding 31 generates heat. The heat generated through energization of the strip-like copper foil forming the winding 31 is efficiently transferred in the width direction of the copper foil; i.e., in the axial direction of the winding 31 (coil 30) (vertical direction in FIG. 1). The heat from the winding 31 is transferred through the axial upper end surface of the winding 31 to the cooling plate 41 via the alumina layer 39 and the adhesive 40. The heat transferred to the cooling plate 41 is then transferred to, for example, the outside by cooling water flowing through the flow passage 41a in the cooling plate 41.

The heat from the winding 31 is also transferred through the axial lower end surface of the winding 31 to the body 20 via the adhesive 45. A portion of the heat from the winding 31 is transferred through the inner wall surface of the winding 31 and the stationary iron core 38 to the body 20 and the cooling plate 41. The heat transferred to the body 20 is then transferred to another member or released to air.

Figure 2:
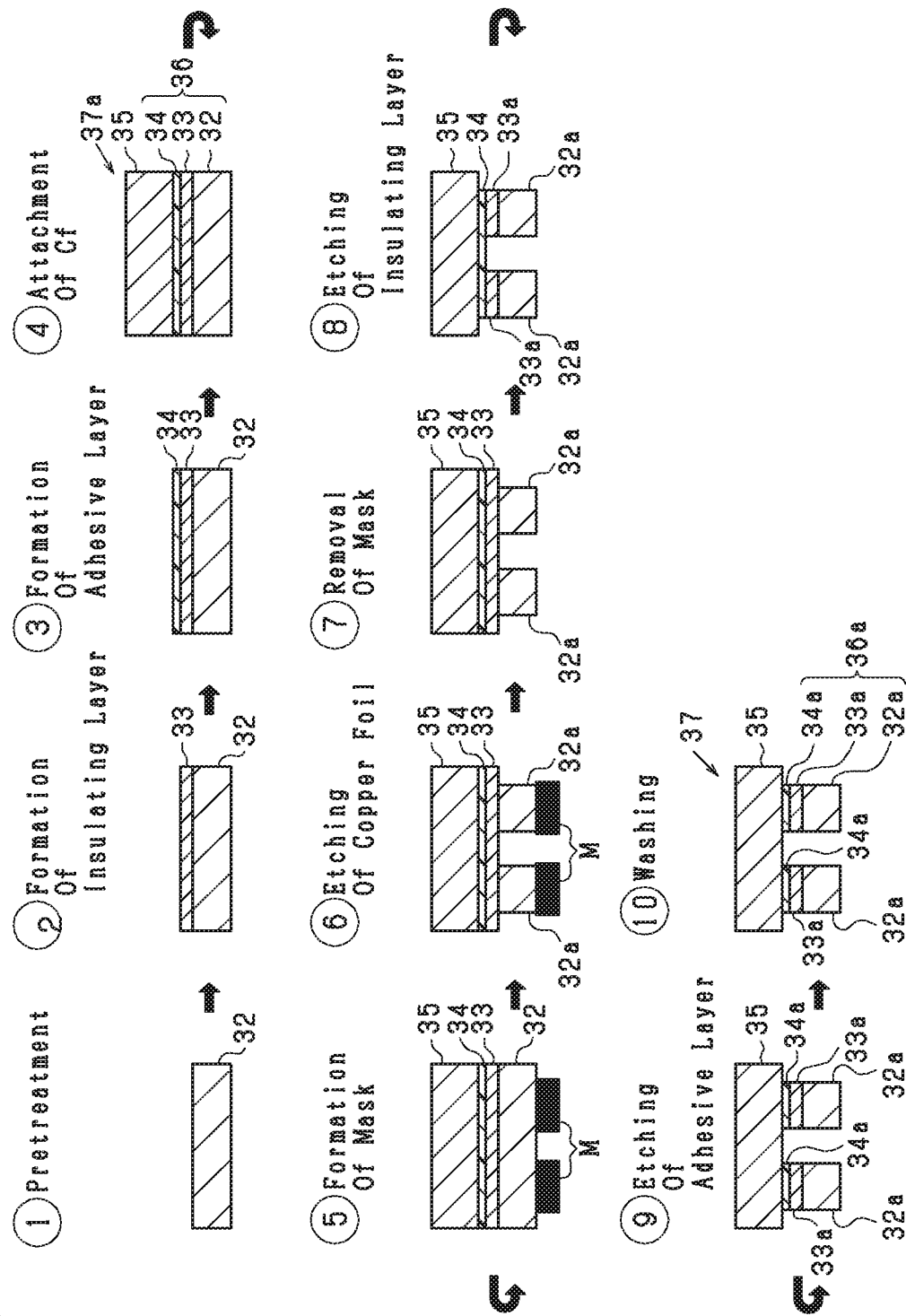
FIG. 2 is schematic diagrams illustrating a method for producing a coil sheet in accordance with one embodiment of the present invention.

Next will be described a method for producing a coil sheet used for the production of the coil 30. FIG. 2 is a schematic view illustrating a method for producing a coil sheet 37.

Step 1 involves the pretreatment (wet blasting) of the surface of a copper foil 32 (conductor layer) for disposing an insulating layer 33 on the upper surface (one surface) of the copper foil 32. The surface of the copper foil 32 is somewhat roughened by wet blasting (roughening treatment) with a liquid such as an acid. This treatment can improve the adhesion between the copper foil 32 and the insulating layer 33. Both surfaces of the copper foil 32 are subjected to wet blasting.

Step 2 involves the formation of the insulating layer 33 (organic insulating layer) on the upper surface of the copper foil 32. Specifically, a composition solution for forming the insulating layer 33 is applied to the upper surface of the copper foil 32. The composition solution is preferably an alkoxy-containing silane-modified polyimide prepared through reaction between polyamic acid and/or polyimide and partially condensed alkoxysilane (refer to, for example, Japanese Patent Application Laid-Open (kokai) No. 2003-200527). The alkoxy-containing silane-modified polyimide is a polyimide-silica hybrid material and is prepared by dissolving, in an organic solvent, a polymer prepared through chemical bonding between polyamic acid (polyimide precursor) and an alkoxysilane compound. Subsequently, the organic solvent is removed from the applied solution by drying, and the solidified component is cured by heating. Thus, polyamic acid is converted into polyimide through ring-closing reaction, and the alkoxysilane compound is converted into silica through curing. The insulating layer 33 (cured film) is formed through dispersion of silica nanoparticles and chemical bonding (crosslinking) between polyimide and silica. That is, the insulating layer 33 is formed of a polyimide-silica hybrid. The copper foil 32 has a linear expansion coefficient (thermal expansion coefficient) approximately equal to that of the insulating layer 33. Specifically, the copper foil 32 (copper) has a linear expansion coefficient of 17 ppm/° C. (m/° C./m), and the insulating layer 33 has a linear expansion coefficient of 10 to 24 ppm/° C.

Step 3 involves the formation of a thermosetting, uncured adhesive layer 34 on the upper surface of the insulating layer 33 (i.e., the surface of the insulating layer 33 opposite the copper foil 32). Specifically, a composition solution for forming the adhesive layer 34 is applied to the upper surface of the insulating layer 33. The composition solution is preferably a solution of an epoxy resin, a curing agent therefor, and an acrylic elastomer in an organic solvent (refer to, for example, Japanese Patent Application Laid-Open (kokai) No. H10-335768 and 2005-179408). Subsequently, the organic solvent is removed from the applied solution by drying, thereby solidifying the epoxy resin and the curing agent therefor. Thus, the adhesive layer 34 is in a B-stage state; i.e., the adhesive layer has not yet been fully cured, but has been apparently solidified; for example, the adhesive layer has been semi-cured, or the solvent has been evaporated from the layer.

Step 4 involves the attachment of a cover film 35 (base layer) on the upper surface of the adhesive layer 34 (i.e., the surface of the adhesive layer 34 opposite the insulating layer 33) at a temperature lower than the temperature at which the adhesive layer 34 is thermally cured. The cover film 35 is formed of polyethylene terephthalate (PET). Specifically, the adhesive layer 34, which is in a B-stage state, exhibits a specific tackiness (adhesive force). Thus, the cover film 35 is bonded to the upper surface of the adhesive layer 34 by bringing the cover film 35 into close contact with the upper surface of the adhesive layer 34. That is, the cover film 35 is bonded to the insulating layer 33 with the adhesive layer 34. As described above, as a result of performance of steps 1 to 4, there is prepared an initial sheet 37a (coil sheet) including the copper foil 32, the insulating layer 33, the adhesive layer 34, and the cover film 35 stacked in this order. The copper foil 32, the insulating layer 33, and the adhesive layer 34 of the initial sheet 37a (i.e., other than the cover film 35) will be collectively referred to as a "laminate sheet 36."

Step 5 involves the formation of a mask M on the surface of the copper foil 32 (i.e., the surface of the copper foil 32 opposite the insulating layer 33) for cutting the copper foil 32 into a predetermined shape. The mask M is formed through, for example, attachment of a resist film on the copper foil 32 and subsequent exposure and development of the film performed such that the mask M has a predetermined shape. Alternatively, the mask M having a predetermined shape may be formed by use of a resist solution through, for example, screen printing.

Step 6 involves the etching of the copper foil 32 with an etchant, such as an acid. Through this step, a portion of the copper foil 32 that is not covered with the mask M is dissolved, so that the copper foil 32 is cut into a predetermined shape. As a result, copper foil patterns 32a each having a predetermined shape are formed. At that time, the insulating layer 33, the adhesive layer 34, and the cover film 35 are not etched with the etchant for the copper foil 32. Steps 5 and 6 correspond to a first cutting step.

Step 7 involves the removal of the mask M. Specifically, the mask M formed of the resist is removed with a solution for peeling (dissolving) the mask M. At that time, the insulating layer 33, the adhesive layer 34, and the cover film 35 are not dissolved in the peeling solution for the mask M. The insulating layer 33 and the adhesive layer 34 may be slightly dissolved in the peeling solution for the mask M.

Step 8 involves the cutting of the insulating layer 33 into a predetermined shape through etching performed by using the copper foil 32 cut into the predetermined shape (copper foil patterns 32a) as a mask. As a result, insulating layer patterns 33a each having a predetermined shape are formed. Specifically, the insulating layer 33 is etched with an etchant that does not dissolve the copper foil 32 or the cover film 35 but dissolves polyimide (refer to, for example, Japanese Patent Application Laid-Open (kokai) No. 2001-305750). Specifically, the etchant for the insulating layer 33 is an aqueous alkaline solution containing both organic and inorganic bases. The adhesive layer 34 may be slightly dissolved in the etchant for the insulating layer 33.

Step 9 involves the cutting of the adhesive layer 34 into a predetermined shape through etching performed by using the copper foil 32 cut into the predetermined pattern (copper foil patterns 32a) as a mask. As a result, adhesive layer patterns 34a each having a predetermined shape are formed. Specifically, the adhesive layer 34 is etched with an etchant that does not dissolve the copper foil 32 or the cover film 35 but dissolves the epoxy resin and the curing agent therefor. The etchant for the adhesive layer 34 contains a component for dissolving the epoxy resin and the curing agent therefor; specifically, at least one species selected from the group consisting of organic solvents and organic bases. Steps 8 and 9 are carried out at a temperature lower than the temperature at which the adhesive layer 34 is thermally cured. Steps 8 and 9 correspond to a second cutting step.

Step 10 involves the washing of the resultant coil sheet 37 with, for example, pure water for removing the remaining etchant. Thus, a plurality of laminate sheet patterns 36a each having a predetermined shape are formed on one surface of the cover film 35.

Figure 3:
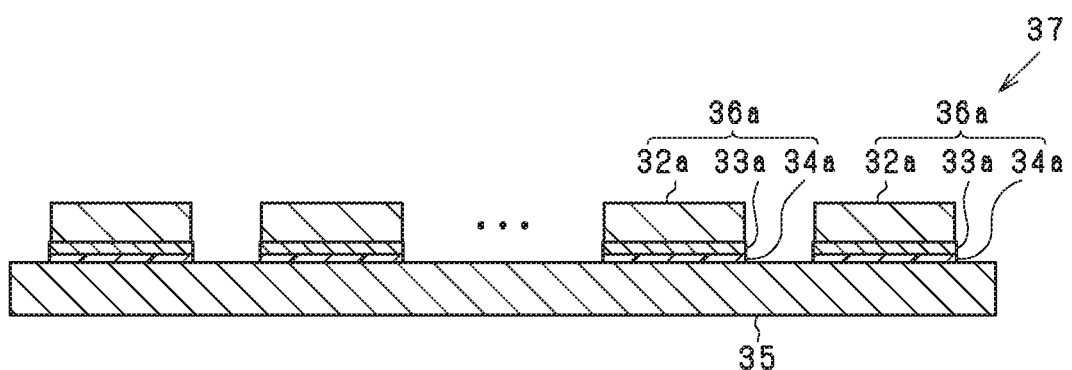
FIG. 3 is a diagram showing a sectional view of a coil sheet in accordance with one embodiment of the present invention.
Figure 4:
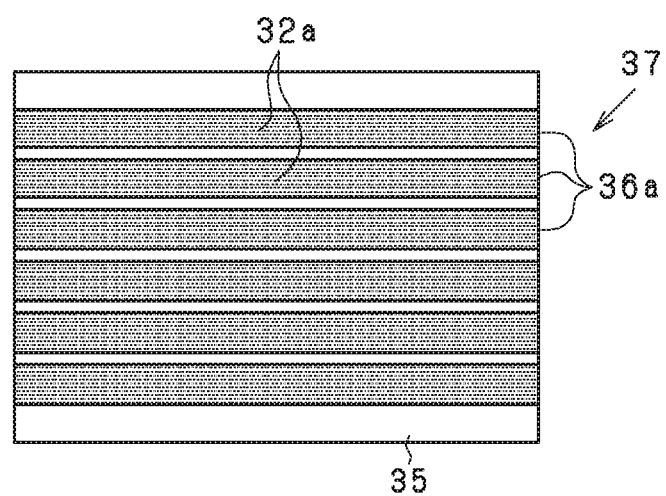
FIG. 4 is a diagram showing a plan view of the coil sheet in accordance with one embodiment of the present invention.
Figure 5:
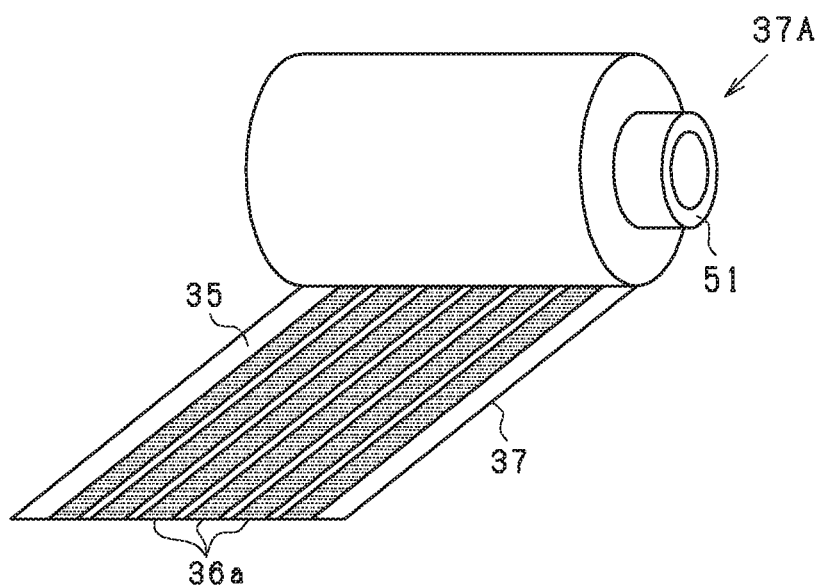
FIG. 5 is a diagram showing a perspective view of a coil sheet roll in accordance with one embodiment of the present invention.

FIG. 3 is a sectional view of the coil sheet 37, and FIG. 4 is a plan view of the coil sheet 37. As illustrated in FIG. 4, in the present embodiment, six strip-like laminate sheet patterns 36a are formed on one surface of the cover film 35. The strip-like laminate sheet patterns 36a extend in the longitudinal direction of the cover film 35 and are in parallel with one another. As illustrated in FIG. 5, the coil sheet 37 is wound around a roll core 51 a plurality of times, thereby preparing a coil sheet roll 37A. The coil sheet 37 may be wound around the roll core 51 such that the cover film 35 faces outward or inward.

Next will be described a step of forming a winding 31 of the laminate sheet pattern 36a (laminate sheet 36) by use of the coil sheet roll 37A (coil sheet 37) with reference to FIG. 6.

The roll core 51A of the coil sheet roll 37A is attached to a first rotary shaft, and a winding roll core 51B is attached to a second rotary shaft. The stationary iron core 38 of the coil 30 is attached to a third rotary shaft. A tension roller TR for applying a specific tension to the sheet is disposed between the first rotary shaft and the third rotary shaft. In place of the stationary iron core 38, a core for forming a winding may be attached to the third rotary shaft.

While the first rotary shaft is rotated clockwise, one laminate sheet pattern 36a is released from the cover film 35 of the coil sheet roll 37A (releasing step). Specifically, the adhesive layer pattern 34a of the laminate sheet pattern 36a is released from the cover film 35. Since the thermosetting adhesive layer pattern 34a is in a B-stage state, the cover film 35 does not strongly adhere to the adhesive layer pattern 34a; i.e., the releasability between the cover film 35 and the adhesive layer pattern 34a can be maintained.

In parallel with the aforementioned releasing step, the released laminate sheet pattern 36a is wound around the stationary iron core 38 while the third rotary shaft is rotated clockwise (winding forming step). Specifically, the laminate sheet pattern 36a, which includes the copper foil pattern 32a, the insulating layer pattern 33a, and the adhesive layer pattern 34a, is wound around the axis (specific axis) of the stationary iron core 38 a plurality of times, thereby forming a winding 31. During this step, a specific tension is applied to the laminate sheet pattern 36a by means of the tension roller TR. End portions, in the width direction, of the laminate sheet pattern 36a are detected by a sensor S. On the basis of the results of detection of the end portions by the sensor S, the axial position of the third rotary shaft (the stationary iron core 38 or winding core) is adjusted so as to prevent the misalignment between end portions of radially adjacent portions of the laminate sheet pattern in the axial direction of the stationary iron core 38. Thus, in the laminate sheet pattern 36a wound around the stationary iron core 38 a plurality of times, the amount of misalignment between end portions of radially adjacent portions of the laminate sheet pattern 36a in the axial direction of the stationary iron core 38 is adjusted to 2% or less the width of the laminate sheet pattern 36a.

In the winding 31, the laminate sheet pattern 36a is wound such that portions of the laminate sheet pattern 36a are overlaid in the radial direction of the winding 31. Therefore, the copper foil pattern 32a of one of two portions of the laminate sheet pattern 36a located adjacent to each other in the radial direction of the winding 31 adheres to the adhesive layer pattern 34a of the other of the two portions. Thus, the portions of the laminate sheet pattern 36a located adjacent to each other in the radial direction of the winding 31 are bonded together by the adhesive force of the adhesive layer pattern 34a.

In parallel with the aforementioned releasing step and winding forming step, the coil sheet 37 from which one laminate sheet pattern 36a has been released is rewound around a roll core 51B while the second rotary shaft is rotated clockwise (rewinding step), thereby preparing a coil sheet roll 37B.

One laminate sheet pattern 36a is released from the coil sheet roll 37A and wound around the stationary iron core 38 until the end of the pattern, thereby completing the winding 31. Thereafter, the coil sheet roll 37A is exchanged with the coil sheet roll 37B, and a new stationary iron core 38 is attached to the third rotary shaft. The aforementioned steps are then repeated until all the six laminate sheet patterns 36a of the coil sheet 37 are consumed, thereby producing six windings 31. Instead of exchanging the coil sheet roll 37A with the coil sheet roll 37B, the coil sheet roll 37A and the coil sheet roll 37B may be rotated counterclockwise, and one laminate sheet pattern 36a may be released from the cover film 35 of the coil sheet roll 37B and wound around the stationary iron core 38.

Figure 7:
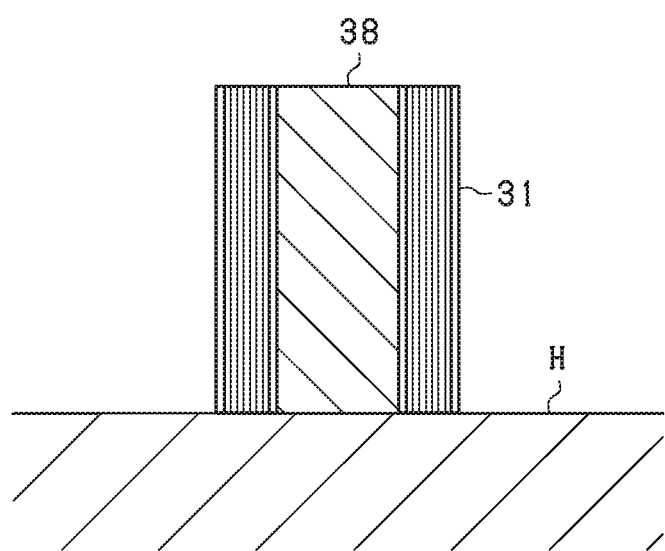
FIG. 7 is a schematic diagram illustrating a step of thermally curing an adhesive layer pattern of a winding in accordance with one embodiment of the present invention.

Next will be described a step of thermally curing the thermosetting adhesive layer pattern 34a of the winding 31 with reference to FIG. 7.

Figure 6:
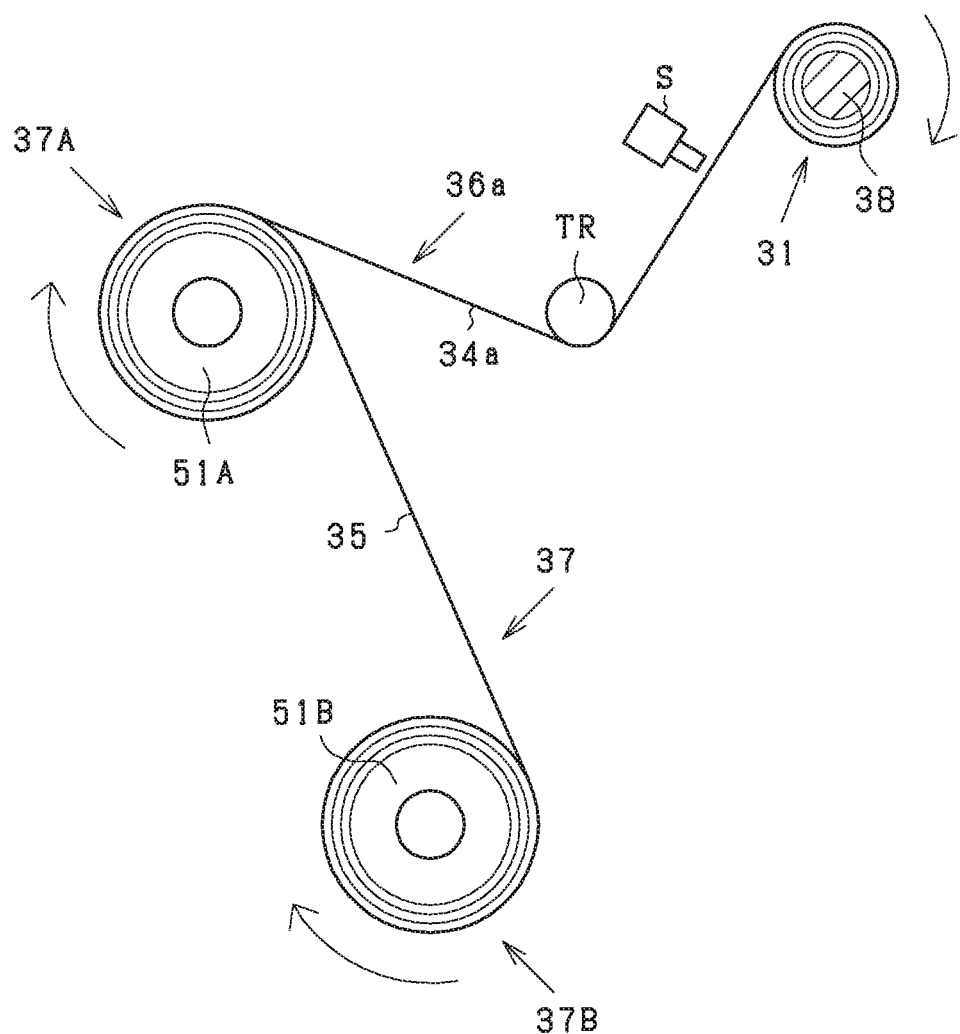
FIG. 6 is a schematic diagram illustrating a step of forming a winding of a laminate sheet pattern in accordance with one embodiment of the present invention.

In the winding 31 formed through the steps illustrated in FIG. 6, the thermosetting adhesive layer pattern 34a, which is in a B-stage state, has not yet been fully cured. Thus, the adhesive layer pattern 34a is thermally cured by heating the winding 31. Specifically, the winding 31 is placed on a heater H such that the surface of the heater H is perpendicular to the axial direction (the direction of the specific axis) of the winding 31. One axial end surface of the winding 31 is brought into contact with the surface of the heater H. The axial end surface of the winding 31 is then heated by means of the heater H at about 120° C. for about two hours. The heat is efficiently transferred in the axial direction of the winding 31 through the copper foil pattern 32a to the interior of the winding 31. Thus, the adhesive layer pattern 34a in the winding 31 is sufficiently thermally cured.

Figure 8:
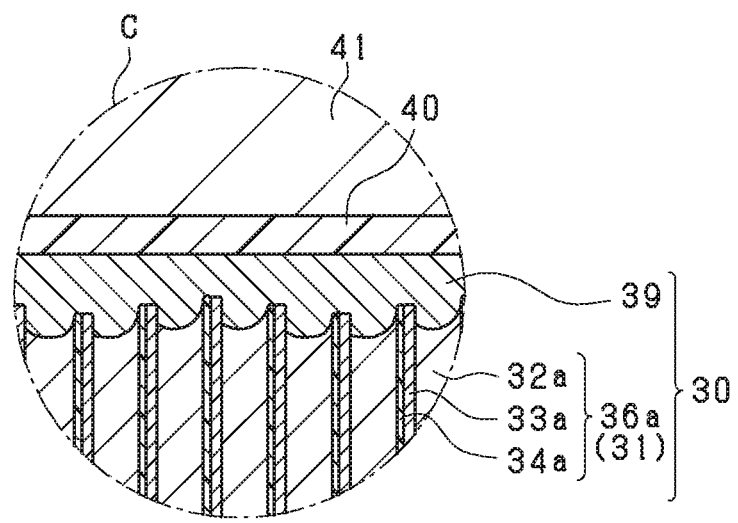
FIG. 8 is a diagram shoeing an enlarged sectional view of region C of the cooling structure of the coil illustrated in FIG. 1.

Next will be described, with reference to FIG. 8, a step of forming an alumina layer 39 on an axial end surface of the winding 31 through thermal spraying, and a step of bonding the alumina layer 39 to a cooling plate 41 with an adhesive 40. FIG. 8 is an enlarged sectional view of region C in FIG. 1.

At the axial end surface (in the vertical direction of FIG. 8) of the winding 31 formed by winding the laminate sheet pattern 36a a plurality of times, dents are formed between the layers (32a, 33a, and 34a) of the laminate sheet pattern 36a. The alumina layer 39 is formed on the axial end surface of the winding 31 through thermal spraying of alumina so as to fill the dents between the layers of the laminate sheet pattern 36a. Thus, the axial end surface of the winding 31 is covered with the alumina layer 39. Alumina to be used has a purity of 98% or more. The surface of the alumina layer 39 is then flattened and finished to have a specific smoothness. In particular, since alumina has a purity of 98% or more, the surface of the alumina layer 39 can be finished very smoothly. The coil 30 is produced through the above-described steps.

Subsequently, an adhesive 40 is applied to the surface of the alumina layer 39 to have a specific thickness, and a cooling plate 41 is bonded to the alumina layer 39. The surface of the cooling plate 41 is also finished to have a specific smoothness. The adhesive 40 is electrically insulating and formed mainly of a heat-resistant resin. The adhesive 40 contains a silicone resin as a main component and has a thickness of about 10 μm.

An adhesive containing a silicone resin as a main component may generate low-molecular-weight siloxane through heating. Low-molecular-weight siloxane is composed of about 3 to 20 siloxane monomers. Low-molecular-weight siloxane may cause poor electrical conduction in an electrically conductive part or fogging in an optical system. The method described in, for example, Japanese Patent Application Laid-Open (kokai) No. H07-330905 is preferably used for reducing the amount of low-molecular-weight siloxane. The aforementioned problems can be avoided by adjusting the total amount of low-molecular-weight siloxane contained in the adhesive 40 to 50 ppm or less.

Figure 9:
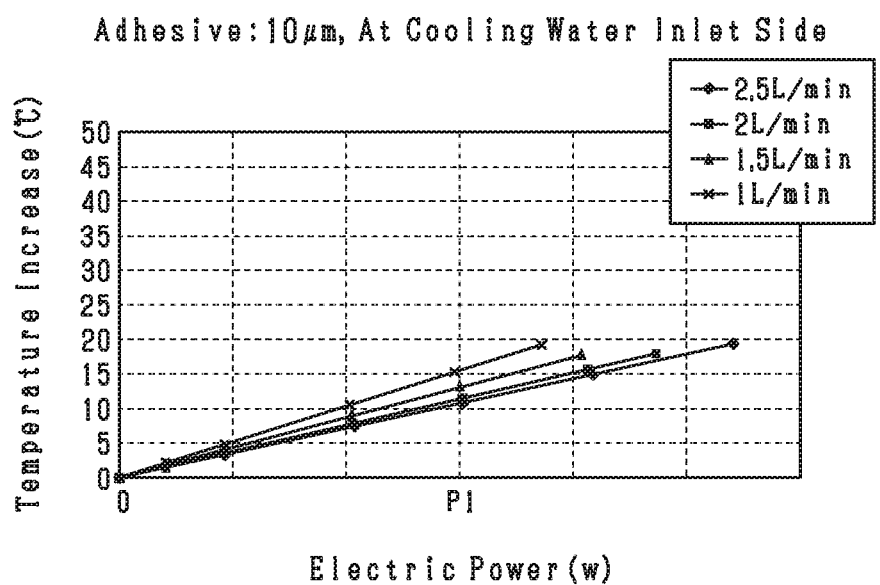
FIG. 9 is a graph illustrating an increase in temperature of a coil at the cooling water inlet side in the case where the thickness of an adhesive is 10 μm.
Figure 10:
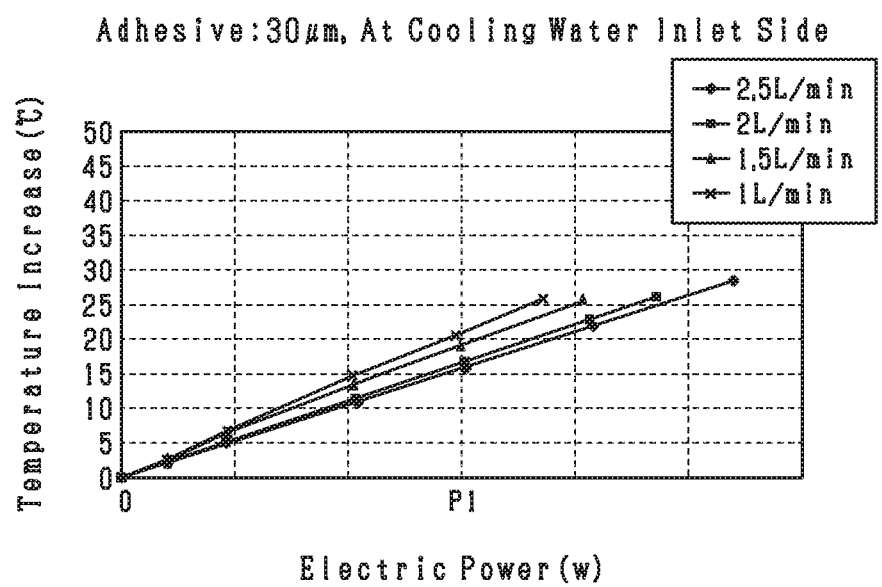
FIG. 10 is a graph illustrating an increase in temperature of a coil at the cooling water inlet side in the case where the thickness of an adhesive is 30 μm.
Figure 11:
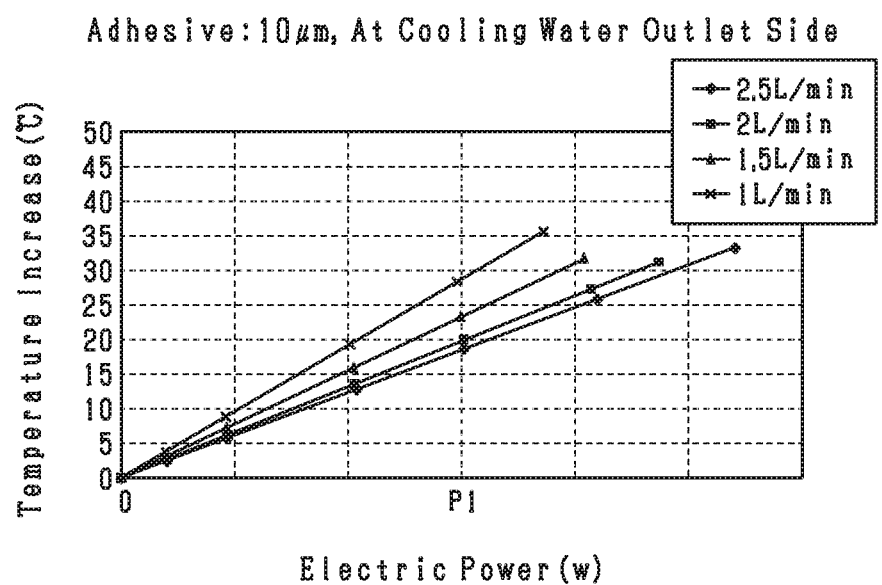
FIG. 11 is a graph illustrating an increase in temperature of a coil at the cooling water outlet side in the case where the thickness of an adhesive is 10 μm.
Figure 12:
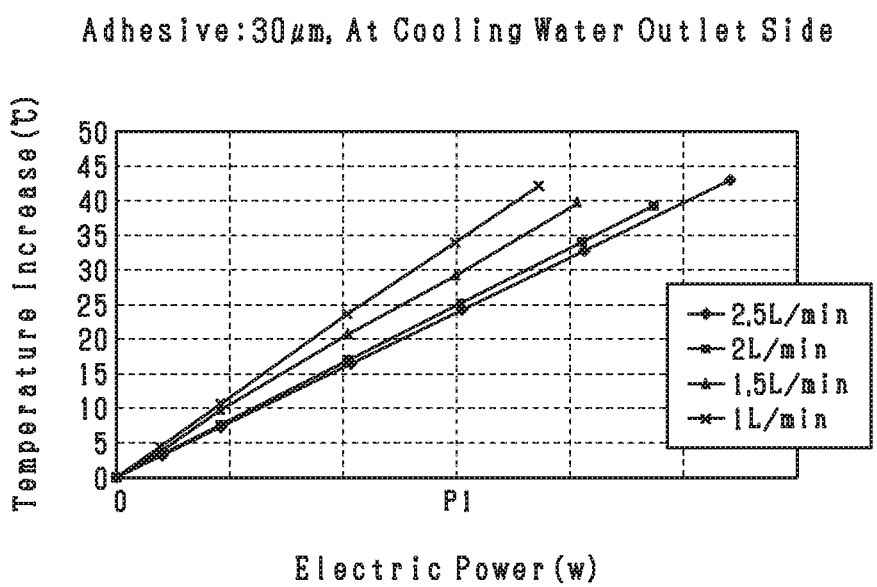
FIG. 12 is a graph illustrating an increase in temperature of a coil at the cooling water outlet side in the case where the thickness of an adhesive is 30 μm.

FIGS. 9 to 12 illustrate the results of measurement of an increase in temperature of the coil 30 at the cooling water inlet or outlet side in the case where the thickness of the adhesive 40 is 10 μm or 30 μm in the cooling structure 10 of the coil 30. FIG. 9 illustrates the results obtained at the cooling water inlet side in the case where the thickness of the adhesive 40 is 10 μm; FIG. 10 illustrates the results obtained at the cooling water inlet side in the case where the thickness of the adhesive 40 is 30 μm; FIG. 11 illustrates the results obtained at the cooling water outlet side in the case where the thickness of the adhesive 40 is 10 μm; and FIG. 12 illustrates the results obtained at the cooling water outlet side in the case where the thickness of the adhesive 40 is 30 μm. The adhesive 40 containing a silicone resin as a main component exhibits a thermal conductivity of 0.2 (W/mK). The adhesive 40 having a thickness of 10 μm exhibits a thermal resistance of 1.45 (mK/W), and the adhesive 40 having a thickness of 30 μm exhibits a thermal resistance of 4.34 (mK/W).

The comparison between the graphs of FIGS. 9 and 10 (the results at the cooling water inlet side) shows that the increase in temperature of the coil 30 (thickness of the adhesive 40: 30 μm) is higher by about 5° C. than that of the coil 30 (thickness of the adhesive 40: 10 μm) at any flow rate of cooling water under supply of electric power P1 to the coil 30. The comparison between the graphs of FIGS. 11 and 12 (the results at the cooling water outlet side) shows that the increase in temperature of the coil 30 (thickness of the adhesive 40: 30 μm) is higher by about 5° C. than that of the coil 30 (thickness of the adhesive 40: 10 μm) at any flow rate of cooling water under supply of electric power P1 to the coil 30.

Thus, a reduction in thickness of the adhesive 40 can prevent an increase in temperature of the coil 30. However, during energization of the coil 30, the temperature of the copper foil pattern 32a increases, leading to thermal expansion thereof. Accordingly, the alumina layer 39 also thermally expands through transfer of heat from the copper foil pattern 32a. Since the cooling plate 41 is cooled by cooling water, an increase in temperature of the cooling plate 41 is suppressed as compared with the alumina layer 39, resulting in reduced thermal expansion of the cooling plate 41. This causes a difference in thermal expansion between the alumina layer 39 and the cooling plate 41, leading to occurrence of thermal stress in the alumina layer 39 and the cooling plate 41.

Since the copper foil pattern 32a has a linear expansion coefficient (thermal expansion coefficient) approximately equal to that of the insulating layer pattern 33a, a difference in expansion can be reduced between the copper foil pattern 32a and the insulating layer pattern 33a even if the copper foil pattern 32a and the insulating layer pattern 33a thermally expand during energization of the coil 30.

Since the adhesive 40 contains a silicone resin as a main component and exhibits elasticity, the adhesive 40 is elastically deformed depending on the difference in thermal expansion between the alumina layer 39 and the cooling plate 41. If the thickness of the adhesive 40 is excessively small, the elastic deformation of the adhesive 40 may fail to follow the difference in thermal expansion during energization of the copper foil pattern 32a, resulting in separation of the adhesive 40 from the alumina layer 39 or the cooling plate 41. In the present embodiment, the adhesive 40 is formed to have such a thickness that the adhesive 40 does not separate from the alumina layer 39 or the cooling plate 41 through elastic deformation during energization of the copper foil pattern 32a and exhibits thermal resistance lower than a specific value. Specifically, according to the experiments performed by the present inventors, the thickness of the adhesive 40 is preferably more than 5 μm and less than 30 μm, most preferably 10 μm.

Advantages

The present embodiment described above in detail has the following advantages.

Since the copper foil 32, the insulating layer 33, and the adhesive layer 34 are cut into a predetermined shape through etching, these layers can be cut at a temperature lower than the temperature at which the adhesive layer 34 is thermally cured. In contrast, if the insulating layer 33 and the adhesive layer 34 are cut by means of burning with a laser, the resultant heat may cause thermal curing of the thermosetting adhesive layer 34, resulting in impaired releasability between the cover film 35 and the adhesive layer 34. According to the aforementioned process, the thermal curing of the thermosetting adhesive layer 34 can be prevented, and the releasability between the cover film 35 and the adhesive layer 34 can be maintained.

The insulating layer 33 is provided through application of a composition solution for forming the insulating layer 33 to one surface of the copper foil 32, and subsequent drying and solidification of the composition. Thus, the insulating layer 33 can adhere to the copper foil 32. Since the adhesive layer 34 is not provided during the drying and solidification of the insulating layer 33, the thermal curing of the thermosetting adhesive layer 34 can be prevented during the drying and solidification of the insulating layer 33. Since the cover film 35 is formed on the surface of the adhesive layer 34 opposite the insulating layer 33 at a temperature lower than the temperature at which the adhesive layer 34 is thermally cured, the thermal curing of the thermosetting adhesive layer 34 can be prevented during the formation of the cover film 35.

The insulating layer 33 is mainly formed of polyimide and thus exhibits excellent thermal resistance and insulating property. The second cutting step involves a step of etching the insulating layer 33 with an etchant that does not dissolve the copper foil 32 or the cover film 35 but dissolves polyimide. Thus, the insulating layer 33 can be cut by etching while the copper foil 32 and the cover film 35 are prevented from being dissolved in the etchant.

The adhesive layer 34 is mainly formed of an epoxy resin and a curing agent therefor and thus exhibits thermosetting and adhesive properties. The second cutting step involves a step of etching the adhesive layer 34 with an etchant that does not dissolve the copper foil 32 or the cover film 35 but dissolves the epoxy resin, the curing agent therefor, and an acrylic elastomer. Thus, the adhesive layer 34 can be cut by etching while the copper foil 32 and the cover film 35 are prevented from being dissolved in the etchant.

Since the insulating layer 33 and the adhesive layer 34 are etched into a predetermined shape by using, as a mask, the copper foil pattern 32a cut into a predetermined shape, a step of forming a mask for etching of the insulating layer 33 and the adhesive layer 34 can be omitted.

Since the copper foil pattern 32a has a thermal expansion coefficient approximately equal to that of the insulating layer pattern 33a, a difference in expansion can be reduced between the copper foil pattern 32a and the insulating layer pattern 33a even if the copper foil pattern 32a and the insulating layer pattern 33a thermally expand during energization of the coil 30. Thus, the separation of the copper foil pattern 32a and the insulating layer pattern 33a, which would otherwise occur due to the difference in thermal expansion therebetween, can be prevented.

The copper foil 32 has a thermal expansion coefficient of 17 ppm/° C. Thus, the separation of the copper foil 32 and the insulating layer 33, which would otherwise occur due to the difference in thermal expansion therebetween, can be prevented by adjusting the thermal expansion coefficient of the insulating layer 33 to 10 to 24 ppm/° C.

Since the copper foil 32 is subjected to wet blasting for roughening its surface, the adhesion between the copper foil 32 and the insulating layer 33 and the adhesive layer 34 located adjacent thereto can be improved.

Since the adhesive layer pattern 34a is thermally cured, the adhesion is improved between radially adjacent portions of the laminate sheet pattern 36a, and the misalignment or separation of radially adjacent portions of the laminate sheet pattern 36a can be reduced during energization of the coil 30. In addition, the strength of the coil 30 can be increased.

The amount of misalignment between end portions, in the direction of a specific axis, of radially adjacent portions of the laminate sheet pattern 36a wound around the specific axis a plurality of times is 2% or less the width of the laminate sheet pattern 36a. In addition, the adhesion between radially adjacent portions of the laminate sheet pattern 36a is improved by the thermal curing of the adhesive layer 34. Thus, the misalignment between radially adjacent portions of the laminate sheet pattern 36a can be maintained at reduced level.

The copper foil pattern 32a, the thermally resistant insulating layer pattern 33a, and the thermosetting, uncured adhesive layer pattern 34a are released from the cover film 35 in the coil sheet 37 wherein the copper foil pattern 32a and the insulating layer pattern 33a are bonded to the cover film 35 with the adhesive layer pattern 34a (releasing step). At that time, the thermosetting adhesive layer pattern 34a is uncured. Therefore, the cover film 35 does not strongly adhere to the adhesive layer pattern 34a; i.e., the releasability between the cover film 35 and the adhesive layer pattern 34a can be maintained.

The laminate sheet pattern 36a, which includes the copper foil pattern 32a, insulating layer pattern 33a, and adhesive layer pattern 34a that are released in the releasing step, is wound around the specific axis a plurality of times, thereby forming a winding 31 (winding forming step). At that time, radially adjacent portions of the laminate sheet pattern 36a adhere to one another by the adhesive force of the adhesive layer pattern 34a. Therefore, misalignment of the radially adjacent portions of the laminate sheet pattern 36a is prevented during the formation of the winding 31 by winding of the laminate sheet pattern 36a.

The winding 31 formed in the winding forming step is heated to thermally cure the adhesive layer pattern 34a (thermally curing step). This step can improve the adhesion between radially adjacent portions of the laminate sheet pattern 36a, can reduce the misalignment or separation of radially adjacent portions of the laminate sheet pattern 36a during energization of the coil 30, and can increase the strength of the coil 30.

Since the laminate sheet pattern 36a is wound under application of a specific tension to the laminate sheet pattern 36a, there can be prevented formation of gaps between radially adjacent portions of the laminate sheet pattern 36a. In general, the winding of the laminate sheet pattern 36a under application of a specific tension thereto is likely to cause an increase in the amount of misalignment between radially adjacent portions of the laminate sheet pattern 36a. In the present embodiment, radially adjacent portions of the laminate sheet pattern 36a adhere to one another by the adhesive force of the adhesive layer pattern 34a, resulting in reduced misalignment between the radially adjacent portions of the laminate sheet pattern 36a.

End portions, in the width direction, of the laminate sheet pattern 36a are detected by the sensor S, and the position of the laminate sheet pattern 36a is adjusted in the direction of the specific axis on the basis of the results of detection of the end portions by the sensor S. Thus, the misalignment between radially adjacent portions of the laminate sheet pattern 36a can be reduced in the direction of the specific axis during winding of the laminate sheet pattern 36a around the specific axis.

Since the winding 31 is heated with the heater H in the direction of the specific axis (i.e., the central axis of the winding 31), heat can be transferred by the copper foil pattern 32a in the direction of the specific axis. Thus, heat is readily transferred to the interior of the winding 31, and the adhesive layer pattern 34a in the winding 31 is readily thermally cured. In the case where the winding 31 is heated with the heater H in a radial direction, heat is less likely to be transferred to the interior of the winding 31, since heat transfer in the radial direction is hindered by the insulating layer pattern 33a and the adhesive layer pattern 34a.

The coil 30 includes the strip-like copper foil pattern 32a wound around the specific axis a plurality of times. The alumina layer 39 is formed on the end surface, in the direction of the specific axis, of the coil 30 through thermal spraying, and the surface of the alumina layer 39 is flattened. Thus, the alumina layer 39 can fill the dents on the end surface of the coil 30 formed by the copper foil pattern 32a wound a plurality of times, and heat from the coil 30 can be efficiently transferred to the flattened surface of the alumina layer 39.

The cooling plate 41 is mainly formed of alumina, and includes therein the flow passage 41a for cooling water. Since the alumina layer 39 is bonded to the cooling plate 41 with the adhesive 40, heat transfer from the alumina layer 39 to the cooling plate 41 can be secured. The heat transferred to the cooling plate 41 is then transferred to, for example, the outside by cooling water flowing through the flow passage 41a in the cooling plate 41.

The adhesive 40 is elastically deformed depending on the difference in thermal expansion between the alumina layer 39 and the cooling plate 41. Thus, the adhesive 40 can absorb the difference in thermal expansion between the alumina layer 39 and the cooling plate 41 during energization of the coil 30. Therefore, thermal stress applied to the cooling plate 41 can be reduced, and the breakage of the cooling plate 41 can be prevented.

The adhesive 40 is formed to have such a thickness that the adhesive 40 does not separate from the alumina layer 39 or the cooling plate 41 due to elastic deformation during energization of the copper foil pattern 32a and exhibits thermal resistance lower than a specific value. Thus, the adhesive 40 can absorb the difference in thermal expansion between the alumina layer 39 and the cooling plate 41, and can also secure heat transfer from the alumina layer 39 to the cooling plate 41.

Since the adhesive 40 is electrically insulating, the adhesive 40 (besides the alumina layer 39) can improve the electrical insulation of the coil 30 in the direction of the specific axis.

The adhesive 40 is formed mainly of a heat-resistant resin. Thus, the adhesive 40 can maintain its properties even if the temperature of the adhesive 40 is increased by heat generated from the coil 30.

The adhesive 40 contains a silicone resin as a main component and has a thickness of more than 5 µm and less than 30 µm. Thus, the adhesive 40 can effectively absorb the difference in thermal expansion between the alumina layer 39 and the cooling plate 41, and can also sufficiently secure heat transfer from the alumina layer 39 to the cooling plate 41.

Since the adhesive 40 contains low-molecular-weight siloxane (composed of 3 to 20 siloxane monomers) in a total amount of 50 ppm or less, the generation of siloxane can be effectively reduced during energization of the coil 30.

The insulating layer 33 is formed by application of a composition solution for forming the insulating layer 33 to the upper surface of the copper foil 32, removal of the organic solvent from the applied composition solution through drying, and curing of the solidified component by heating. Thus, the insulating layer 33 can be provided on one surface of the copper foil 32 without using, for example, an adhesive, thereby preventing a reduction in thermal resistance of the coil 30 caused by, for example, the adhesive.

Since the insulating layer 33 is formed of a polyimide-silica hybrid material, the insulating layer 33 exhibits improved adhesion to the copper foil 32 as compared with an insulating layer formed of polyimide without use of silica.

The copper foil 32 has a linear expansion coefficient (thermal expansion coefficient) approximately equal to that of the insulating layer 33. This configuration can prevent warpage of the copper foil 32 and the insulating layer 33 after formation of the insulating layer 33 on one surface of the copper foil 32.

Since the axial end surface of the winding 31 is fixed with the alumina layer 39, the coil 30 exhibits improved strength.

Modifications

The above-described embodiments can be modified as follows.

The mask M for etching of the copper foil 32 may be dissolved in the etchant for etching of the insulating layer 33 or the etchant for etching of the adhesive layer 34. With this configuration, step 7 involving the removal of the mask M can be omitted. The etchant used in step 9 may be the same as the etchant used in step 8 for dissolving polyimide. In such a case, steps 8 and 9 can be carried out simultaneously. This is preferred for simplification of the process.

The adhesive layer 34 may be formed of a composition other than the aforementioned composition containing, as main components, an epoxy resin, a curing agent therefor, and an acrylic elastomer.

The insulating layer 33 may be formed of a composition other than the aforementioned composition containing polyimide as a main component.

The coil sheet 37 is not necessarily in the form of the coil sheet roll 37A. The coil sheet 37 may be used as is (i.e., in a sheet or strip form).

Figure 13:
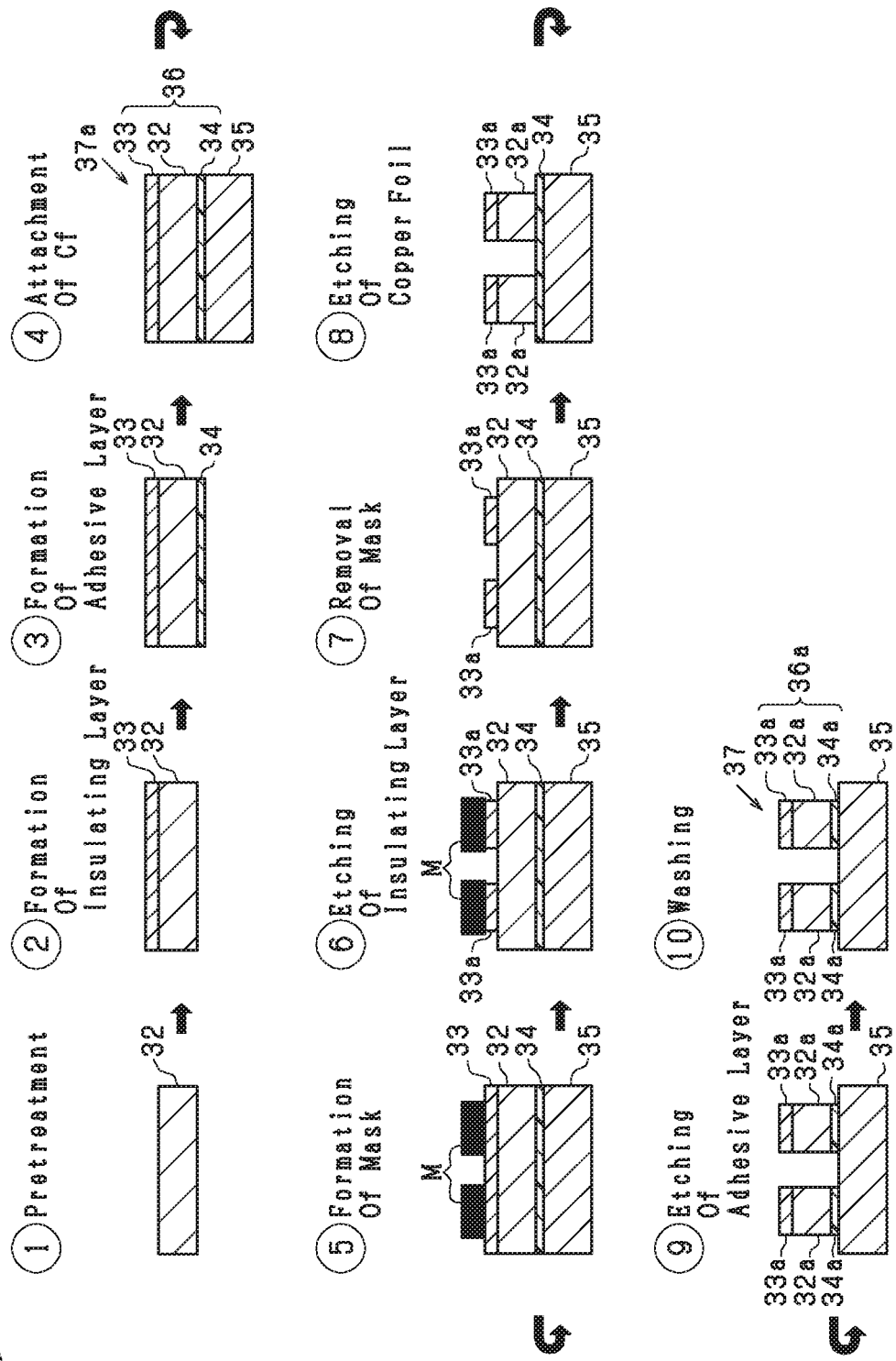
FIG. 13 is a schematic diagram illustrating a modification of the method for producing a coil sheet in accordance with one embodiment of the present invention.

The order of formation of the layers of the coil sheet 37 may be varied. As illustrated in FIG. 13, steps 1 and 2 are carried out in the same manner as steps 1 and 2 illustrated in FIG. 2. In step 3, the adhesive layer 34 is formed on the surface of the copper foil 32 opposite the insulating layer 33. In step 4, the cover film 35 is attached to the adhesive layer 34. In step 5, the mask M for etching of the insulating layer 33 is formed. In step 6, the insulating layer 33 is etched. In step 7, the mask M is removed. In step 8, the copper foil 32 is etched. In step 9, the adhesive layer 34 is etched by using the copper foil pattern 32a as a mask. In step 10, the coil sheet 37 is washed. These steps can produce the coil sheet 37 including the cover film 35, the adhesive layer pattern 34a, the copper foil pattern 32a, and the insulating layer pattern 33a stacked in this order. The insulating layer 33 and the adhesive layer 34 may be cut by means of burning with a laser so long as the insulating layer 33 and the adhesive layer 34 can be prevented from being thermally cured, or the releasability between the cover film 35 and the adhesive layer 34 can be maintained.

The coil sheet 37 may include a layer besides the copper foil 32, the insulating layer 33, the adhesive layer 34, and the cover film 35. For example, the coil sheet 37 may have a structure including the cover film 35, the adhesive layer 34, the copper foil 32, the adhesive layer 34, and an insulating layer stacked in this order. In such a case, the adhesive layer 34 can be maintained in a B-stage state by bonding the insulating layer to the copper foil 32 with the adhesive layer 34 instead of drying and curing the insulating layer.

The conductor layer may be a silver foil or an aluminum foil in place of the copper foil 32. In such a case, the conductor layer preferably has a thermal expansion coefficient approximately equal to that of the insulating layer. However, the thermal expansion coefficient of the conductor layer is not necessarily approximately equal to that of the insulating layer.

The laminate sheet pattern 36a is wound under application of a specific tension to the laminate sheet pattern 36a. The tension may be constant from the start to end of winding of the laminate sheet pattern 36a or may be varied during winding thereof.

The adhesive containing a silicone resin as a main component may be subjected to reduced-pressure treatment in place of washing with acetone for reducing the amount of low-molecular-weight siloxane. Such a treatment can drastically reduce the amount of low-molecular-weight siloxane contained in the adhesive.

If the adhesive 40 does not contain a silicone resin as a main component, the treatment for reducing the amount of low-molecular-weight siloxane may be omitted. For example, the adhesive 40 may be a polyurethane or rubber adhesive having relatively high thermal conductivity.

The stationary iron core 38 may be replaced with a non-magnetic stationary core (e.g., alumina) depending on the type of the electromagnetic actuator. The present invention can be applied to, for example, a linear motor in which a plurality of coils 30 are linearly arranged so as to move a movable unit disposed above the cooling plate 41 and including a permanent magnet.

The flow passage 41a of the cooling plate 41 may have any shape.

What is claimed is:

1. A coil formed of a laminate sheet prepared from a coil sheet, the coil sheet including: a conductor layer; a single insulating layer formed of thermally resistant organic material and directly formed on the conductor layer; and a base layer bonded to the single insulating layer with a single thermosetting adhesive layer in a B-stage state interposed therebetween, such that the conductor layer, the single insulating layer, the single adhesive layer, and the base layer are stacked in this order with no other layers, wherein the laminate sheet has a three-layer structure formed of the conductor layer, the single insulating layer, and the single adhesive layer only, which are released from the base layer, and wherein the laminate sheet is wound around an axis a plurality of times to form a winding of the laminate sheet having a plurality of turns around the axis, such that the single adhesive layer of one turn which is thermally cured is in direct contact with the conductor layer of another turn next to the one turn.

2. The coil according to claim 1, wherein the conductor layer has a thermal expansion coefficient approximately equal to that of the insulating layer.

3. The coil according to claim 2, wherein the conductor layer is formed of copper, and the insulating layer is formed of a polyimide-silica hybrid.

4. The coil according to claim 2, wherein the conductor layer is formed of copper, and the insulating layer has a thermal expansion coefficient of 10 to 24 ppm/° C.

5. The coil according to claim 2, wherein the conductor layer is subjected to surface roughening treatment.

6. The coil according to claim 1, wherein the conductor layer is formed of copper, and the insulating layer is formed of a polyimide-silica hybrid.

7. The coil according to claim 6, wherein the conductor layer is formed of copper, and the insulating layer has a thermal expansion coefficient of 10 to 24 ppm/° C.

8. The coil according to claim 1, wherein the conductor layer is formed of copper, and the insulating layer has a thermal expansion coefficient of 10 to 24 ppm/° C.

9. The coil according to claim 1, wherein the conductor layer is subjected to surface roughening treatment.

10. The coil according to claim 1, wherein the amount of misalignment between end portions, in a direction of the axis, of radially adjacent portions of the laminate sheet wound around the axis a plurality of times is 2% or less the width of the laminate sheet.

* * * * *